(12) United States Patent
Chin et al.

(10) Patent No.: US 7,313,504 B2
(45) Date of Patent: Dec. 25, 2007

(54) MODEL MANAGEMENT TECHNOLOGY USING GROUPING OF FEATURES

(75) Inventors: Ricardo Chin, Shrewsbury, MA (US); Robert P. Zuffante, Concord, MA (US); Ilya Baran, Newton, MA (US)

(73) Assignee: SolidWorks Corporation, Concord, MA (US)

( * ) Notice: Subject to any disclaimer, the term of this patent is extended or adjusted under 35 U.S.C. 154(b) by 661 days.

(21) Appl. No.: 10/269,480

(22) Filed: Oct. 11, 2002

(65) Prior Publication Data

US 2003/0085889 A1 May 8, 2003

Related U.S. Application Data

(60) Provisional application No. 60/329,490, filed on Oct. 15, 2001.

(51) Int. Cl.
*G06F 17/50* (2006.01)
(52) U.S. Cl. .................. 703/1; 700/97; 700/98
(58) Field of Classification Search ............ 703/1; 700/97, 98
See application file for complete search history.

(56) References Cited

U.S. PATENT DOCUMENTS

| | | | | |
|---|---|---|---|---|
| 5,815,154 A | 9/1998 | Hirschtick et al. | ......... | 715/853 |
| 6,256,596 B1 | 7/2001 | Leite, Jr. et al. | ................ | 703/2 |
| 6,629,065 B1* | 9/2003 | Gadh et al. | .................... | 703/1 |
| 6,898,560 B1* | 5/2005 | Das | ............... | 703/7 |
| 2002/0107673 A1* | 8/2002 | Haller et al. | .................. | 703/1 |

OTHER PUBLICATIONS

Boris Mayer St-Onge, "Pro/ENGINEER* Tutorial Home Page", May 29, 1998, retrieved from "http://wwwrobot.gmc.ulaval.ca/interne/documentation/proeng/" on Dec. 15, 2005, pp. 1-8 and 1-15.*

Dr. Mark Archibald, "Mechanical Engineering Design with Pro/ENGINEER Release 2001", Jun. 19, 2001, pp. 2-1 to 2-54.*

(Continued)

*Primary Examiner*—Paul Rodriguez
*Assistant Examiner*—Jason Proctor
(74) *Attorney, Agent, or Firm*—Victor Siber, Esq.

(57) ABSTRACT

Modeling of a three-dimensional object includes storing data representing a computer model of the three-dimensional object. The data includes a number of feature objects each of which defines a feature of the computer model. A feature chain is formed and includes at least one feature object having a design effect limited in scope such that an operation for removing material operates to affect the feature of the computer model defined by another feature object in the same feature chain and does not affect the feature of the computer model defined by the feature object not in said same feature chain. Multiple feature chains can be combined to form an interrelationship among feature objects that represents a hierarchy defining construction of the model from the feature objects.

21 Claims, 14 Drawing Sheets

OTHER PUBLICATIONS

"A Pro/ENGINEER tip for CAD Drawings," May 2001, retrieved on Feb. 6, 2007 from http://www.synthx.com/tom/sy_tip_0105.htm, pp. 1-3.*

TechniCom eWeekly document, Issue 90, May 31, 2001.

Su C-J et al., *An Integrated Form-Feature-Based Design System for Manufacturing*, Journal of Intelligent Manufacturing, vol. 6, No. 5, Oct. 1995, pp. 277-290.

Sormaz D.N. et al., *Modeling of Manufacturing Feature Interactions for Automated Process Planning*, Journal of Manufacturing Systems SOC., vol. 19, No. 1, 2000, pp. 28-45.

Allada V. et al., *Feature-based Modeling Approaches for Integrated Manufacturing: State-of-the-Art Survey and Future Research Directions*, Integrated Journal of Computer Integrated Manufacturing UK, vol. 8, No. 6, Nov. 1995, pp. 411-440.

* cited by examiner

MODEL MANAGEMENT TECHNOLOGY USING GROUPING OF FEATURES

This application claims priority from U.S. provisional patent application No. 60/329,490, filed Oct. 15, 2001, and titled "Model Management Technology Using Feature Chains."

BACKGROUND OF THE INVENTION

Computer-aided design (CAD) software allows a user to construct and manipulate complex three-dimensional (3D) models of assembly designs. A number of different modeling techniques can be used to create a model of an assembly. These techniques include solid modeling, wire-frame modeling, and surface modeling. Solid modeling techniques provide for topological 3D models, where the 3D model is a collection of interconnected edges and faces, for example. Geometrically, a 3D solid model is a collection of trimmed surfaces. The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these, and other, modeling techniques, such as parametric modeling techniques.

Parametric modeling techniques can be used to define various parameters for different features and components of a model, and to define relationships between those features and components based on relationships between the various parameters. Solid modeling and parametric modeling can be combined in CAD systems supporting parametric solid modeling.

A design engineer is a typical user of a 3D CAD system. The design engineer designs physical and aesthetic aspects of 3D models, and is skilled in 3D modeling techniques. The design engineer creates parts and may assemble the parts into one or more subassemblies. In addition to parts, a subassembly may also consist of other subassemblies. Using parts and subassemblies, the design engineer designs an assembly. Hereinafter, parts and subassemblies are collectively referred to as components.

A part is constructed using various geometric building blocks. Geometric building blocks, hereinafter referred to as features, may be constructed by first creating a two-dimensional profile and extruding that profile into a three-dimensional object. Features may be divided into two primary categories. The two primary categories are features used to add material to a part, such as a boss, and features used to subtract material from a part, such as a cut.

The order in which a design engineer creates features while constructing a part affects the physical structure of that part in a feature-based CAD system. For example, a part constructed first by cutting a block with a cylinder and then adding a boss that extends inside the void left by the cut cylinder will result in a hole with material from the boss inside the hole. If the order of the operations were reversed such that the boss was added before the cylindrical cut, then the cut would not only cut the material of the original block, but also that of the subsequent boss, resulting in a hole with no material inside of it.

Generally, in a feature-based CAD system, a feature acts on all features that have been previously included in the model and has no effect on features subsequently introduced to the model. Thus, feature-based modeling systems are also history-based modeling system. The design engineer is required to control the scope of a feature by manipulating the feature's location in the overall historical order of features. Commercially available feature-based modeling systems include the SolidWorks® 2001Plus software system available from SolidWorks Corporation of Concord, Mass.

History-based CAD systems that define components as a sequence of simple feature operations work on the same principal. The data (e.g., points, lines, and dimensions) necessary to regenerate a component is stored as one or more features and the component keeps an ordered list of these features. Each feature has a corresponding regeneration algorithm that takes the feature data and the geometry resulting from the previous features in the ordered list and modifies the geometry according to the feature's definition (e.g., make a cut of a certain shape at a certain location). To create a new component, the user typically will add features one by one to the component's feature list. To modify a feature, the user simply changes the feature's data and then the system recreates the component by deleting the old resulting geometry and regenerating each feature one by one in the order in which the user originally specified the features. Thus, in the current state of the art, the user's feature creation order is identical to the internal feature regeneration order.

While building a part, the order in which a design engineer should introduce features and direct the system to perform operations is not always intuitive. Many times the design engineer has invested a great deal of time designing a part before discovering that the features should be introduced in a different order. When the design engineer realizes that the feature ordering did not achieve the desired result (e.g., the desired geometric result), he or she must modify the definition of the part, for example, by rearranging the hierarchical structure of the part.

One way in which the definition of a part may be modified is to redesign the features that define the part. Those features that were introduced in an order that caused the geometry to be generated incorrectly may need to be deleted and re-created in an order that causes the geometry to be generated correctly. Thus, the design engineer must spend additional time defining the same feature again.

Another way in which the definition of a part may be modified is to change the feature history. A CAD system may keep track of the feature history and present the history to the design engineer as a hierarchical collection of features. The feature history may be presented in a window (or a section of the window) generated by the CAD system. The design engineer may be able to rearrange the collection of features by dragging a depiction of a feature to a different position in the hierarchical collection, and thereby modify the feature history for a part. U.S. Pat. No. 5,815,154 to Hirschtick et al discloses a system for modifying a model by allowing a user to graphically manipulate a hierarchical collection of features.

Some design engineers may decide that re-designing the part is too time-consuming. A design engineer may find that the incorrect geometry can be easily corrected by adding a cut that is identical to another cut. Although the identical cut is redundant, the geometry is corrected quickly without re-ordering the features in a part.

Due to the problem of introducing features in a particular order, modeling a part may require a great deal of planning and expertise. The design engineer must determine the correct ordering of features before creating the features to obtain the desired geometric result. The ordering problem is present throughout the modeling process. The difficulty of the ordering problem may increase as the modeling process progresses because as a part becomes more complex, the design engineer has more difficulty determining the correct feature order. Although, a CAD system may provide a feature management tool to help a design engineer rearrange the history of features included in a part, the design engineer is encumbered with analyzing the feature history and reordering the features in the part hierarchy as necessary to ensure that the part is geometrically correct.

A design engineer who intends to become skilled in 3D feature-based modeling needs to become proficient in ordering features. Learning how best to introduce features is part of the experience necessary for becoming skilled in the art of 3D feature-based modeling.

Additionally, features may be dependent on other features. For example, the position of one hole may depend on the position of a second hole. This type of geometric dependency may be defined by establishing a parametric relationship between the two holes. When the value of an attribute of one feature in the parametric relationship is modified, the value of an attribute of another feature in the parametric relationship may be automatically modified in response. Generally, a design engineer intends that a parametric relationship be preserved when re-ordering the hierarchical structure of a part. The burden is placed on the design engineer first to be aware of the dependencies and second to ensure that they are preserved (perhaps by re-establishing the dependencies if the dependencies are severed during a re-ordering process).

Often the design engineer discovers that the feature order results in the creation of a physically incorrect part. Therefore, a burden is placed on the design engineer to recreate portions of the part or the entire part, re-order the features that constitute the part, or in some other tedious manner, correct the inaccurate geometry. The design engineer spends an enormous amount of time and effort during the 3D modeling process controlling the feature order and the feature order's effect on the final geometric representation of a part.

SUMMARY OF THE INVENTION

Users of computer-aided design systems do not need to concern themselves with the order in which features are defined for a model when feature creation order and feature generation order are independent of one another. To facilitate the independence of feature creation order and feature regeneration order, systems and methods may be provided to determine the scope of a feature.

Systems and methods for defining a scope of a feature are disclosed herein. In some implementations, these systems and methods include storing data that defines features of a computer model and forming a feature chain with at least one feature object. The feature object has a design effect limited in scope such that an operation for removing material operates to affect another feature object in the same feature chain and does not affect feature objects in another feature chain. Feature chains are combined and form an interrelationship among feature objects that represents a hierarchy, which defines the construction of the model from the feature objects. In one aspect, an unordered feature list comprising the plurality of feature objects is read, at least one feature object that adds material to the computer model is located, and at least one feature object that removes material from the computer model and is associated by a scope definition with the feature object that adds material is located. A feature object that removes material can have a never-fill attribute to indicate a cutting effect on each feature object that adds material.

Further aspects include optimizing the feature chains and inputting the combination of the feature chains, which prescribes the regeneration order, into a process that generates a part. Moreover, the scope definition can be based on feature object existence, on feature object proximity, or on a combination of feature object existence and feature object proximity. Implementations can enable the user to issue an instruction to modify the scope definition, whereby the instruction explicitly specifies either a feature object to include in the scope definition or a feature object to exclude from the scope definition. Additionally, a user interface dialog can facilitate the explicit specification of the scope definition.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

The present invention allows design engineers to design components without worrying about feature order. This is achieved by separating the concepts of feature creation order and feature regeneration order. Therefore, the order in which a user adds features to a component is independent of the order in which the geometric feature operations (e.g., applying a boss or applying a cut) are applied to the underlying geometric model. The present invention provides a mechanism that automatically determines feature regeneration order independent of the user's feature creation order. Such an automated mechanism saves the design engineer an enormous amount of time and effort during the 3D modeling process because he or she is freed from redesigning parts and/or manipulating the order of features to correct geometry. Unlike conventional feature-based modeling systems wherein the feature regeneration order is defined and controlled solely by the user, the present invention controls the regeneration order, which not only takes a large burden off the user, but also adds beneficial dynamic qualities overall to a feature-based modeling system.

The present invention enables design engineers to construct featured-based models without excessive consideration to the order in which the features are defined. Rather than requiring a design engineer to rely on feature order to control the final geometric representation of a part, the present invention builds data structures that group features and automatically modifies the groupings as needed. The groupings may be modified when the design engineer indicates the scope upon which a feature should act (i.e., explicit scope), when certain attributes of the feature indicate an implicit scope, or when a combination of explicit and implicit scope so indicates. By providing an automated process for ordering and grouping the features that contribute to the definition of a part, the present invention gives the design engineer additional controls over the final shape of a part, and enhances the flexibility and functionality of a computerized modeling system.

Figure 1:
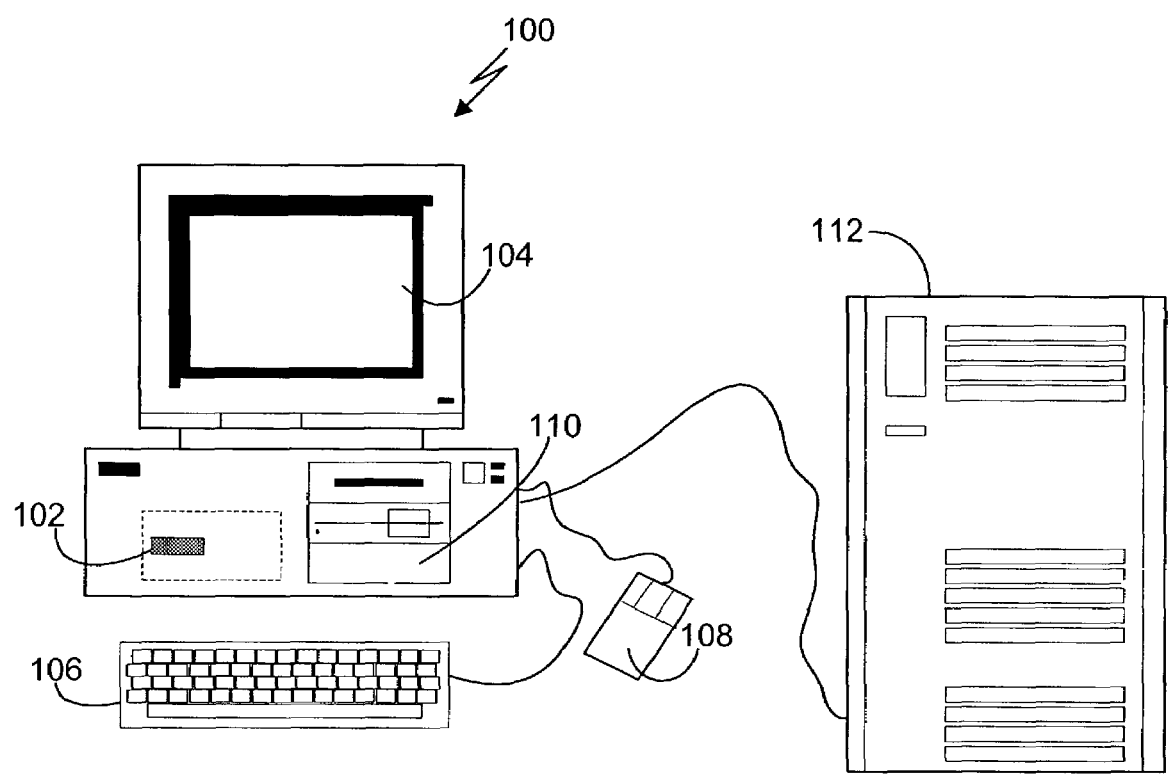
FIG. 1 is a diagram of a computer system.

FIG. 1 shows a computerized modeling system 100 that includes a CPU 102, a CRT 104, a keyboard input device 106, a mouse input device 108, and a storage device 110. The CPU 102, CRT 104, keyboard 106, mouse 108, and storage device 110 can include commonly available computer hardware devices. For example, the CPU 102 can include a Pentium-based processor. The mouse 108 may have conventional left and right buttons that the user may press to issue a command to a software program being executed by the CPU 102. Other appropriate computer hardware platforms are suitable as will become apparent from the discussion that follows. Such computer hardware platforms are preferably capable of operating the Microsoft Windows NT, Windows 95, Windows 98, Windows 2000, Windows XP, Windows ME, or UNIX operating systems.

Computer-aided design software is stored on the storage device 110 and is loaded into and executed by the CPU 102. The software allows the design engineer to create and modify a 3D model and implements aspects of the invention described herein. The CPU 102 uses the CRT 104 to display a 3D model and other aspects thereof as described later in more detail. Using the keyboard 106 and the mouse 108, a design engineer can enter and modify data associated with the 3D model. The CPU 102 accepts and processes input from the keyboard 106 and mouse 108. The CPU 102 processes the input along with the data associated with the 3D model and makes corresponding and appropriate changes to that which is displayed on the CRT 104 as commanded by the modeling software. Additional computer processing units and hardware devices (e.g., video and printer devices) may be included in the computerized modeling system 100. Furthermore, the computerized modeling system 100 may include network hardware and software thereby enabling communication to a hardware platform 112. Those of ordinary skill in the art will appreciate that the invention could also be used in conjunction with other computer-aided design software that addresses applications other than mechanical design.

A computer-aided modeling system may have the capability of retaining a design engineer's original design intent as a model undergoes modifications before the model design is complete. A parametric modeling system (or a parametric solid modeling system), ensures that certain aspects of the design engineer's intent are retained. In one embodiment, the underlying data structures of the modeling software behave parametrically. For example, the geometry, display attributes, and annotations displayed as part of the model on the CRT 104 are updated as needed when a design engineer changes the model. Those of ordinary skill in the art will appreciate how to design a parametric modeling system.

In one embodiment, the modeling system is a solid modeling system. The model may be an assembly of solid model components or simply a part. The solid model may have relationships that parametrically constrain the definitions of one or more components or features with respect to one another. If a parametrically constrained relationship exists between two features, a geometric modification to one feature may cause a geometric modification in the other feature. The present invention may preserve parametric relationships in the reorganized part structure by using computational resources to analyze the dependencies when ordering features and ensuring that the dependencies are maintained.

Figure 2:
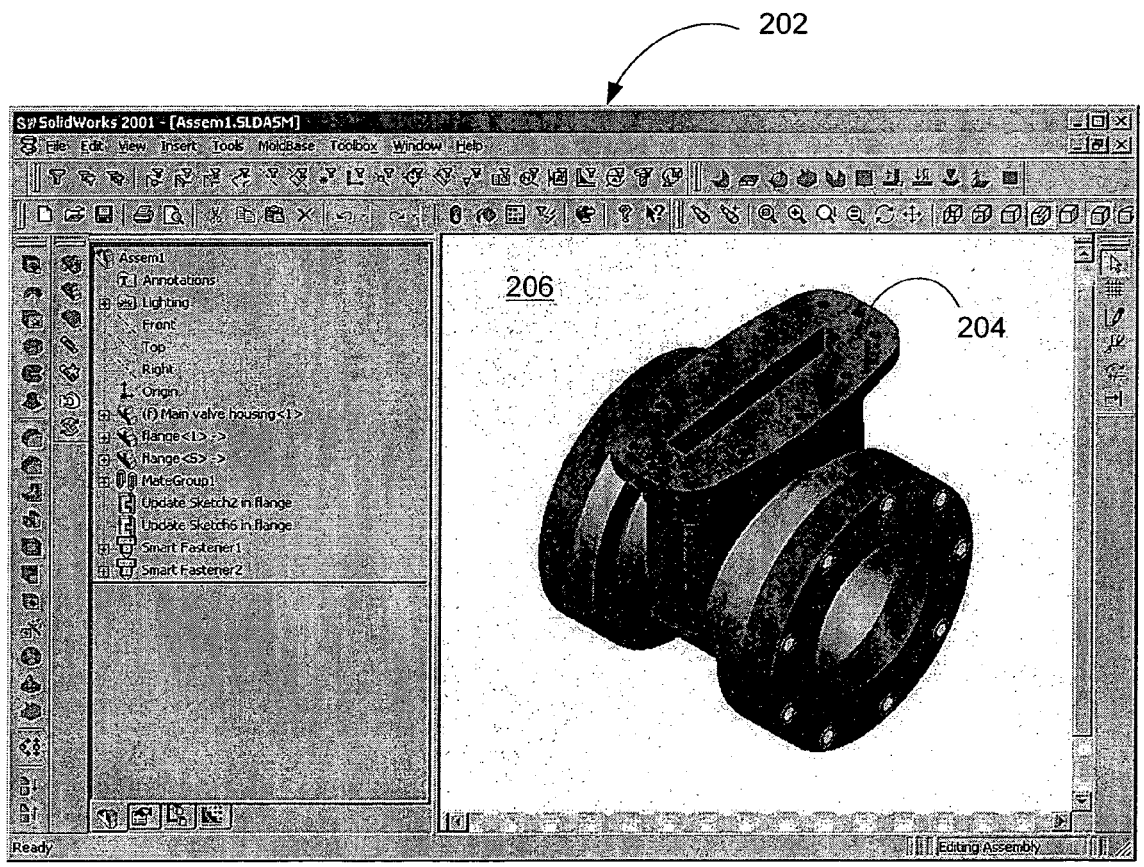
FIG. 2 is an illustration of a model displayed in a window.

FIG. 2 shows a window 202 displayed on the CRT 104 and generated by a CAD software system. The window 202 is a conventional computer-generated window that can be programmed by one of ordinary skill in the art using conventional, commercially available, software programming tools, such as those available from Microsoft Corporation of Redmond, Wash.

A computer-generated 3D model 204 is displayed within a modeling portion 206 of the window 202. The design engineer can construct and modify the 3D model 204 in a conventional manner. The surfaces of the 3D model 204 can be displayed, or the 3D model 204 can be displayed using solid lines and dashed lines to show visible edges and hidden edges, respectively, of the 3D model. Implementations also may include other window areas, such as an order independent list of features 208, which helps the design engineer visualize and manipulate the model 204 shown in the modeling portion 206.

Figure 3:
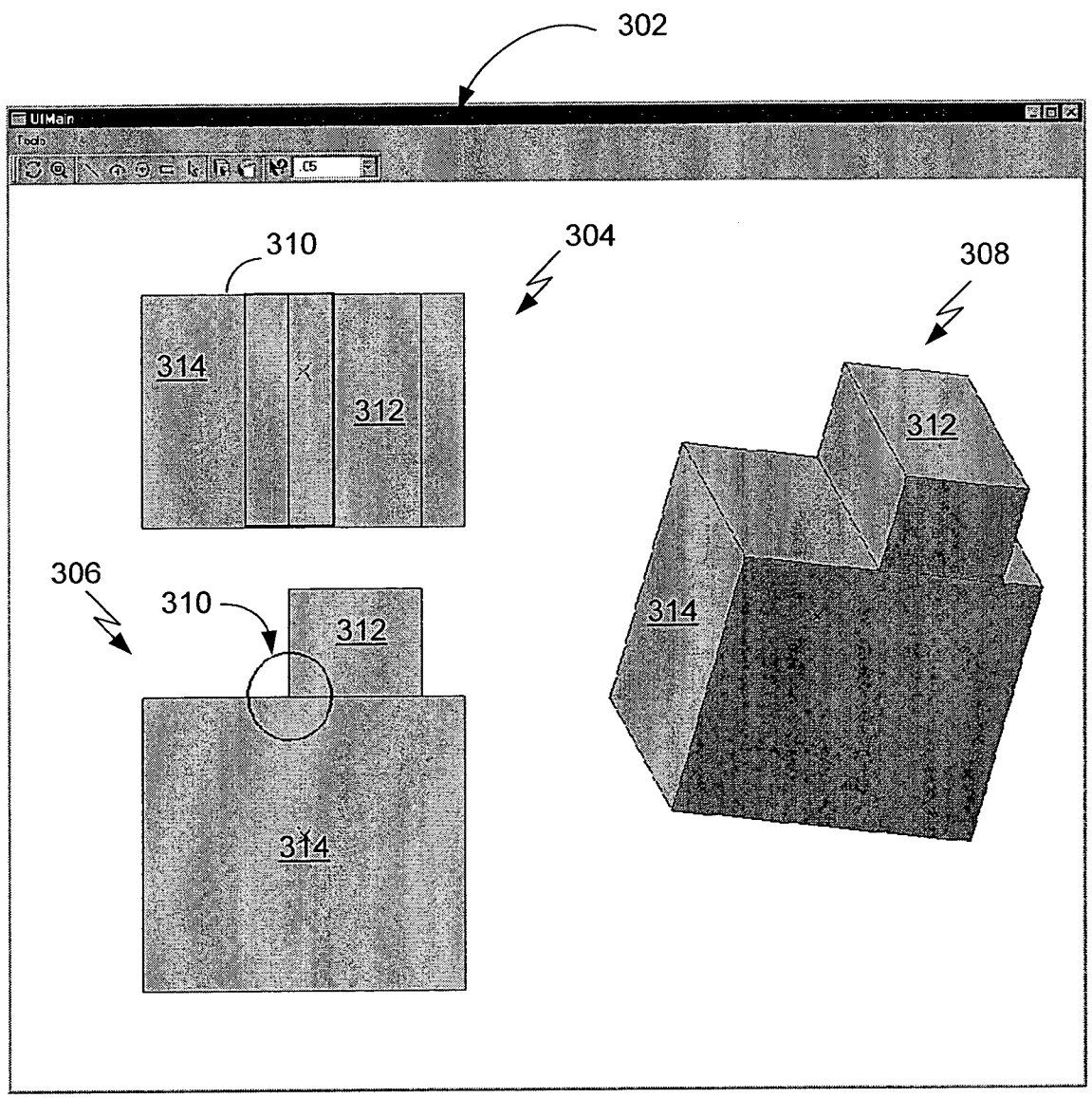
FIG. 3 is an illustration of three views of a part.

FIG. 3 shows a window 302 that contains three views of a part under construction. The top view 304, front view 306, and rotated view 308 reveal that the part is partially defined by two block features (i.e., upper block 312 and lower block 314). Additionally, the top view 304 and the front view 306 plainly show an extruded profile 310 of a circle. The purpose of the extruded profile 310 is to create a cylindrical cut feature in the part.

Figure 4:
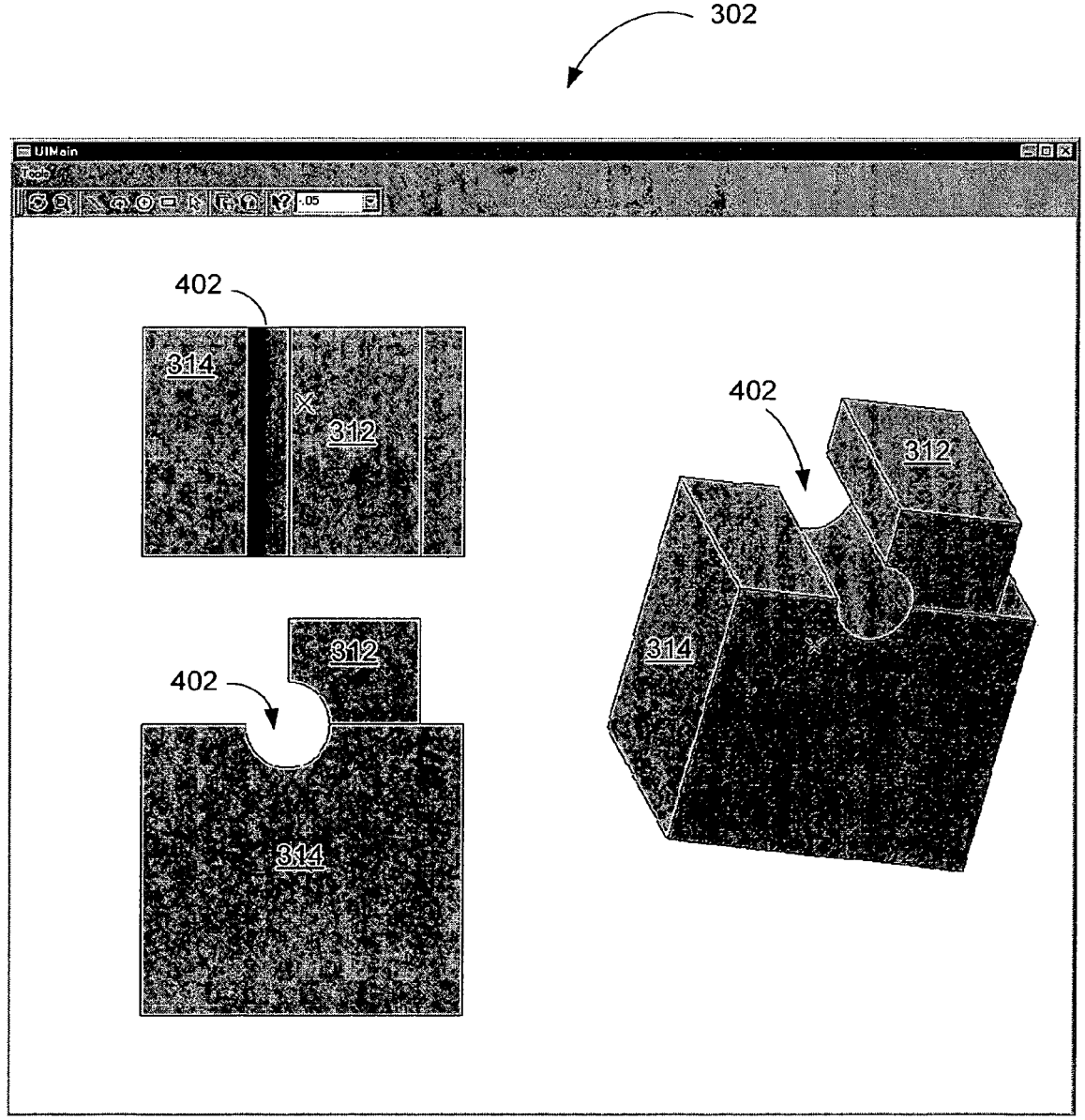
FIG. 4 is an illustration of three views of a part.

FIG. 4 shows the window 302 after the extruded profile 310 was used to construct a cut feature 402. The cut 402 was created by subtracting material that was located within the extruded profile 310 from the upper block 312 and the lower block 314. The cut 402 would appear as illustrated in FIG. 4 in a CAD system that is based on feature existence if the upper block 312 and the lower block 314 were included in the part definition (i.e., existed) prior to the inclusion of cut feature 402.

Figure 5:
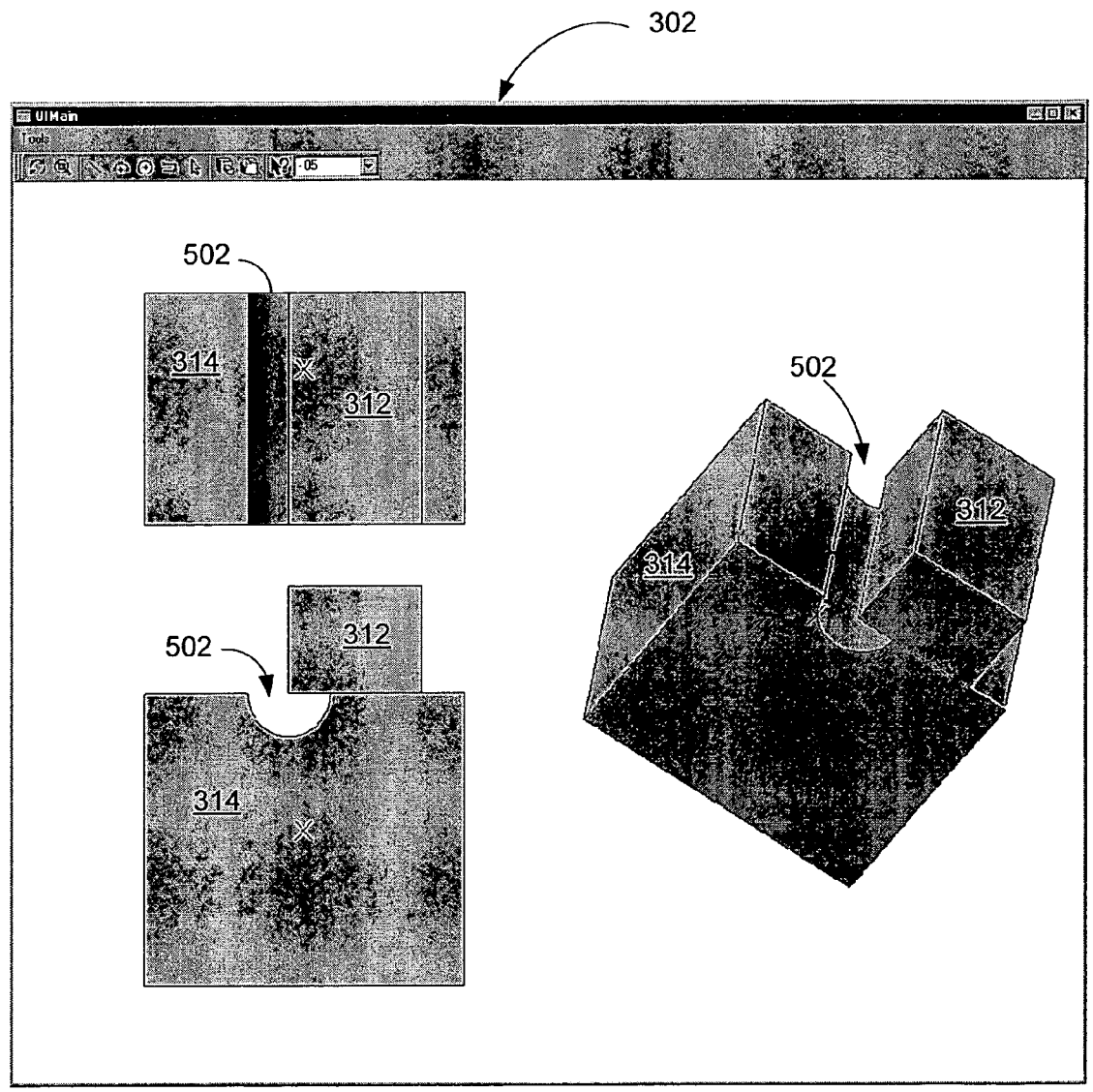
FIG. 5 is an illustration of three views of a part.

FIG. 5 shows the window 302 containing a part in which a cut feature 502 did not subtract material from the upper block 312. The cut 502 may appear as illustrated in FIG. 5 in a CAD system that is based on feature existence if the lower block 314 was included in the part definition first, the cut feature 502 was included in the part definition second, and the upper block 312 was included in the part definition third. Therefore, the scope of the cut 502 is the lower block 314 only.

Rather than being solely dependent on the prior existence of features, the present invention allows a design engineer to explicitly specify one or more features on which a particular feature acts. This enables the design engineer to include a feature in or exclude a feature from the scope of a particular feature. Hereinafter, the collection of features on which another feature acts is referred to as "feature scope." A feature has explicit feature scope if that feature removes material from another feature as instructed by a design engineer. For example, the present invention enables the design engineer to include the upper block 312 and the lower block 314 in the part definition prior to introducing the cut feature 502, then indicate that the feature scope of the cut feature 502 is lower block 314 only, thereby constructing the part shown in FIG. 5.

While a part is being designed, the design engineer may discover that the part is physically incorrect due to the order in which features were introduced during the design process. Unlike conventional, history-based modeling systems, the present invention enables the design engineer to specify the explicit scope of a feature. A user interface command may facilitate the specification of explicit scope of a feature, as will be discussed.

A feature may also have implicit feature scope. One example of implicit feature scope is when a feature removes material from an existing feature without being instructed to do so by the design engineer. This may occur due to the order in which a feature was introduced to a part and/or due to a proximity calculation wherein the physical extent of a feature determines the implicit feature scope. Another example of implicit feature scope is when a first feature removes or does not remove material from a second feature based on an attribute of the first or second feature. Such implicit scope results, by way of non-limiting example, when a cut is defined with a "never-fill" attribute that prevents any feature that adds material to fill the cut with material. Additionally, a boss (i.e., any feature that adds material) may be defined with a "nevercut" attribute that prevents the boss from being included in any cut's feature scope, meaning that the boss will not be affected by any cut.

Features may also have a combination of implicit and explicit scope. As an example, a "never-fill" attribute may be overridden by certain actions. Such an action may occur when a user specifically instructs the modeling system to override the "never-fill" attribute for a particular feature or a collection of features (e.g., a pocket feature constructed from more than one feature).

Implicit and explicit feature scopes are not mutually exclusive. That is, although the system may implicitly determine a feature's scope, the design engineer would subsequently be able to explicitly modify the system-determined feature scope and even redefine the feature scope entirely.

Referring once again to FIG. 4, assume that when the design engineer built the part illustrated in FIG. 4, he or she defined the cut 402 first, followed by the upper block 312, and then lower block 314. In this case, upper block 312 and lower block 314 may be included explicitly in the feature scope of cut 402 if the design engineer instructs the system to apply the cut 402 to the upper block 312 and the lower block 314. One way in which a design engineer may specify explicit feature scope is for the CAD system to provide a user interface command that enables the design engineer to select the cut 402 then select the block or blocks on which the cut 402 should act.

In one embodiment, the user interface contains a command for specifying the explicit scope of a feature. After selecting the command, the design engineer may first select one feature that removes material from the part, then may select one or more features that add material to the part, then indicate that the selection is complete. Alternatively, the design engineer may first select one or more features that add material to the part, then may select one feature that removes material from the part, then indicate that the selection is complete. The present invention analyzes the selected features and determines whether a feature that removes material was selected first or whether one or more features that add material were selected first. When a feature that removes material is selected prior to the selection of features that add material, the selected features that add material are automatically added to the feature scope of the selected feature that removes material from the part. When one or more features that add material are selected prior to a feature that removes material, the features that add material to the part are automatically excluded from the feature scope of the feature that removes material from the part. Thus, the behavior of the user interface command depends on which type of feature was selected first.

The user interface in an embodiment may also display a dialog box to facilitate the specification of feature scope. The dialog box may list features belonging to the feature scope of a particular feature and allow the design engineer to add or remove features from the feature scope list. The CAD system may provide graphical feedback by highlighting, in the modeling portion of a window, those features belonging to the feature scope. The design engineer may also be allowed to pick features in the modeling portion of the window to add and remove from the feature scope, such that an associative relationship exists between the features as listed in the dialog box and as displayed in the modeling portion of the window.

Continuing to refer to FIG. 4, assume that when the design engineer built the part illustrated in FIG. 4, he or she randomly defined the lower block 314 first, followed by the upper block 312, and then the cut 402. In one embodiment, the feature scope of the cut 402 is the upper block 312 and the lower block 314. This scope may be determined implicitly based on the features that exist at the time of feature creation, that is, block 312 and block 314 may be included implicitly in the feature scope of cut 402 because cut 402 was included in the part after the inclusion of upper block 312 and lower block 314. A boss added subsequently, however, would not be included implicitly in the scope of cut 402.

Implicit feature scope may also be determined by proximity in combination with prior existence of a feature. When implicit scope is determined by proximity, the feature scope of a feature that removes material includes any feature that adds material and that volumetrically interferes with the feature that removes material. Another pre-existing feature that adds material that is outside the volume of the cutting area is excluded from the feature scope of the feature that removes material. A combination of prior existence of a feature and geometry proximity as well as other feature-feature relationships can be used to determine implicit feature scopes.

Figure 6A:
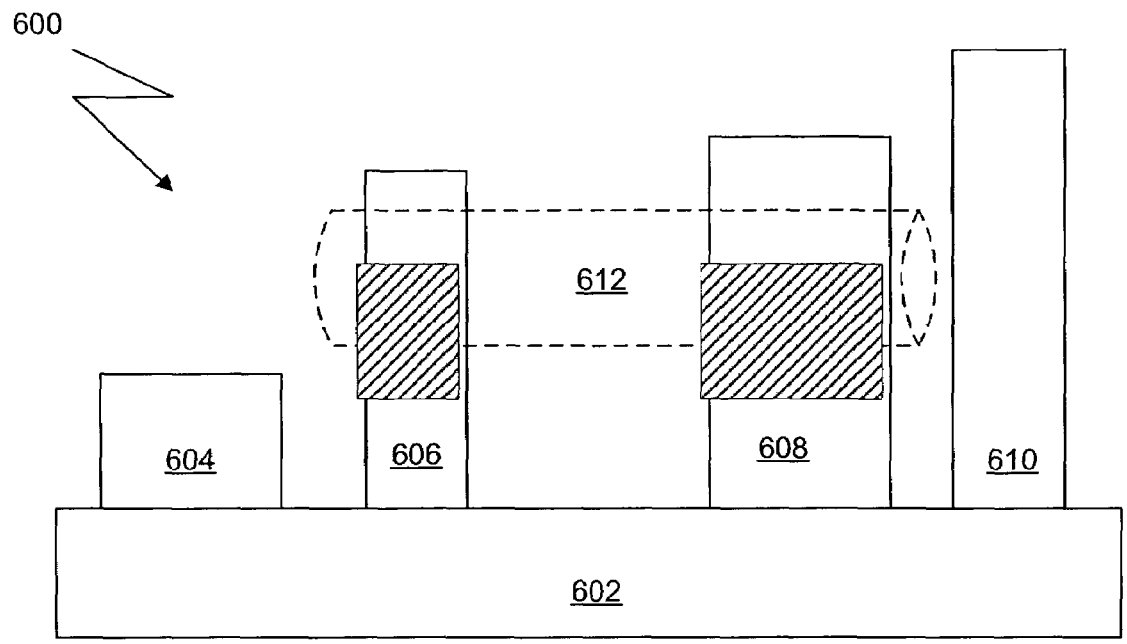
FIG. 6a is an illustration of a part consisting of five bosses and one cut.

Referring now to FIG. 6a, a part 600 consisting of five bosses (602-610) and a cylindrical cut 612 is shown. In an embodiment that determines implicit scope based on the proximity of features in addition to feature existence, the feature scope of the cylindrical cut 612 is all bosses that existed prior to the definition of the cylindrical cut 612 and volumetrically interferes with the cylindrical cut 612. Assuming for this illustration that bosses 602-610 existed prior to cylindrical cut 612, the feature scope of cylindrical cut 612 is boss 606 and boss 608 because boss 606 and boss 608 are within the extent of the cylindrical cut 612.

Figure 6B:
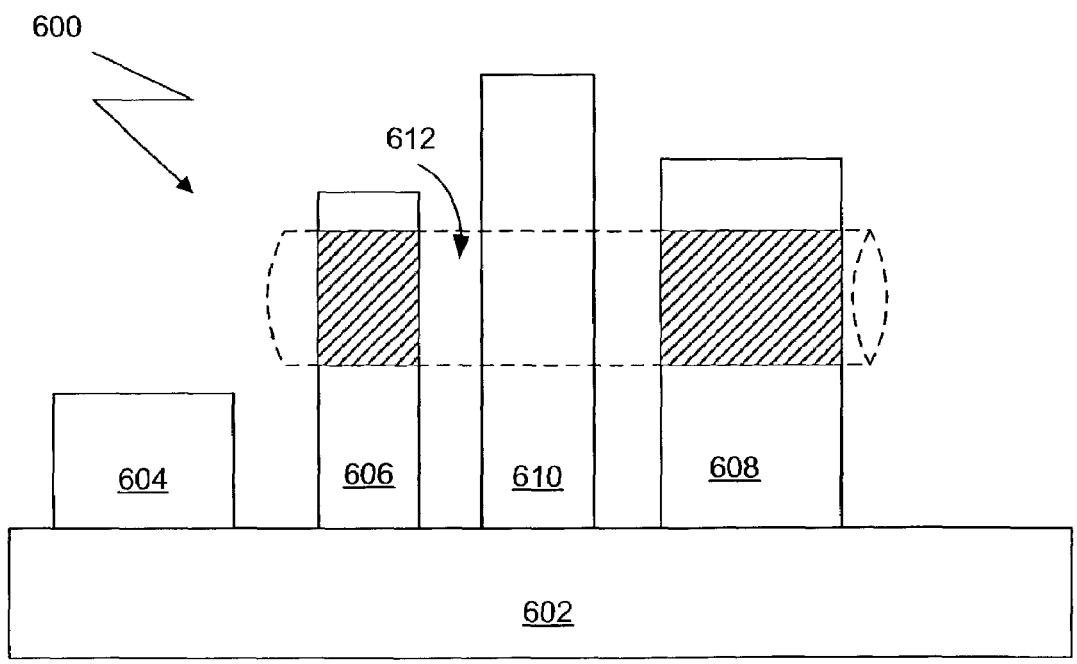
FIG. 6b is an illustration of a part consisting of five bosses and one cut.

Referring now to FIG. 6b, the part 600 is modified such that boss 610 is positioned between boss 606 and boss 608. When the part is modified to reposition the boss 610, the feature scope of the cylindrical cut 612 is not modified. The feature scope of cylindrical cut 612 is not modified because in this embodiment the proximity and pre-existence criteria for determining feature scope are applied at the time of feature creation (and not at subsequent re-generations of the part) and serve as a basis for the feature scope. After feature creation, the feature scope is under the design engineer's control. However, if cylindrical cut 612 had a "never-fill" attribute, boss 610 would be included in the feature scope of cylindrical cut 612 after being moved.

An aspect of the present invention dynamically groups and orders features, and determines how groupings of features should be combined. The groupings and the order of features in each grouping are determined by feature scope. A grouping of features is hereinafter referred to as a "feature chain."

In one embodiment, features belonging to the same feature chain may be combined using Boolean operations. Additionally, one or more feature chains may then be combined to produce the final shape of a part. One feature chain may always exist to consolidate all other feature chains.

A feature chain maintains three volumes. The first volume is a positive volume that combines all features that add material. The second volume is a negative volume that combines all features that remove material. The third volume combines the positive and negative volumes.

There are two types of feature chains, simple feature chains and composite feature chains. Simple feature chains always have one feature that adds material and zero or more features that remove material. A composite feature chain can have one or more features or feature chains that add material, and one or more features or feature chains that remove material.

A feature chain generator builds simple feature chains whenever a feature is added, a feature is removed, a feature scope is modified, or a shell definition is modified. Composite feature chains are formed from simple feature chains and then may be input to an optimization process.

Either simple feature chains or optimized composite feature chains are used as input to a rebuild engine, which constructs the part. The feature chains specify the feature order to the rebuild engine, opposed to conventional history-based modeling systems where the user was solely responsible for specifying order.

Figure 7:
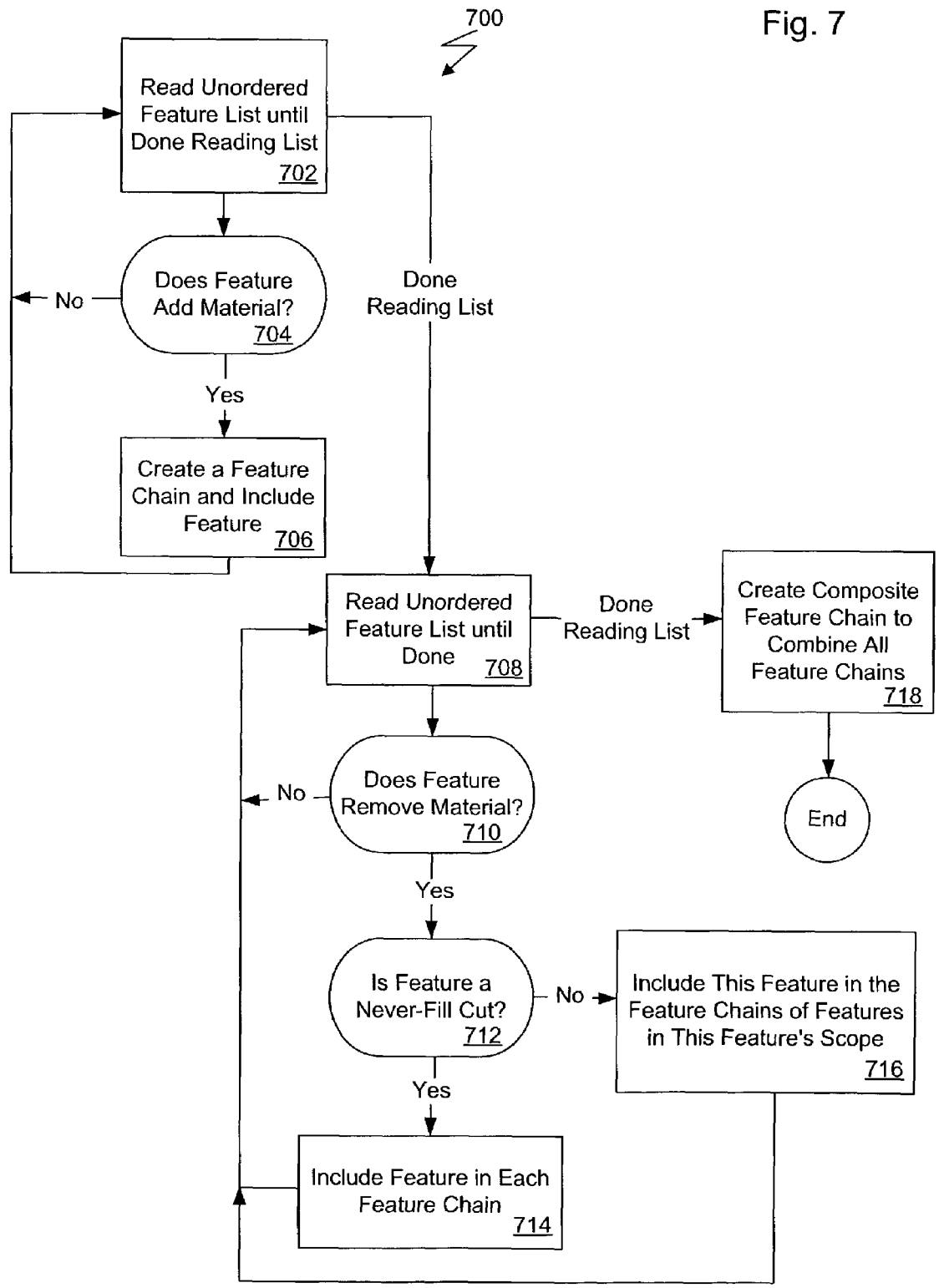
FIG. 7 is a flowchart of a procedure performed by the feature chain generator.

Referring now to FIG. 7, a flowchart of a procedure 700 performed by the feature chain generator in an embodiment is shown. The procedure 700 reads an unordered feature list 702. The unordered feature list is created when the design engineer first defines a feature and is updated as additional features are defined and when features are deleted. As the unordered feature list is read, the procedure 700 determines if a feature adds material to a part 704. If the feature adds material to the part, a simple feature chain is created and the feature is included as the positive volume (and the first feature) in the simple feature chain 706.

When the procedure 700 has finished locating all features that add material, the procedure 700 locates all features that remove material. Thus, the procedure 700 may read the unordered feature list again 708. The procedure 700 determines if a feature removes material 710, and if so, determines the feature scope of that feature. Data in the form of feature scope and never-fill indicators is associated with all features that remove material, which aids in the determination of feature scope. The procedure 700 determines if the feature is a cut having a "never-fill" attribute 712, and if the feature is, the feature is included in each simple feature chain 714. (Alternatively, in another embodiment, the "never-fill" cut is added to the composite feature chain only.) If the feature is a feature that removes material but is not a cut having a "never-fill" attribute, then the feature scope for that feature is examined. The feature is then included as the negative volume in all simple feature chains having as the positive volume the features in the feature scope 716.

When the procedure 700 has located all features that remove material, a composite feature chain is created to combine all feature chains 718. A Boolean union operation may be performed to combine all feature chains. After the feature chains are combined, procedure 700 completes.

Figure 8:
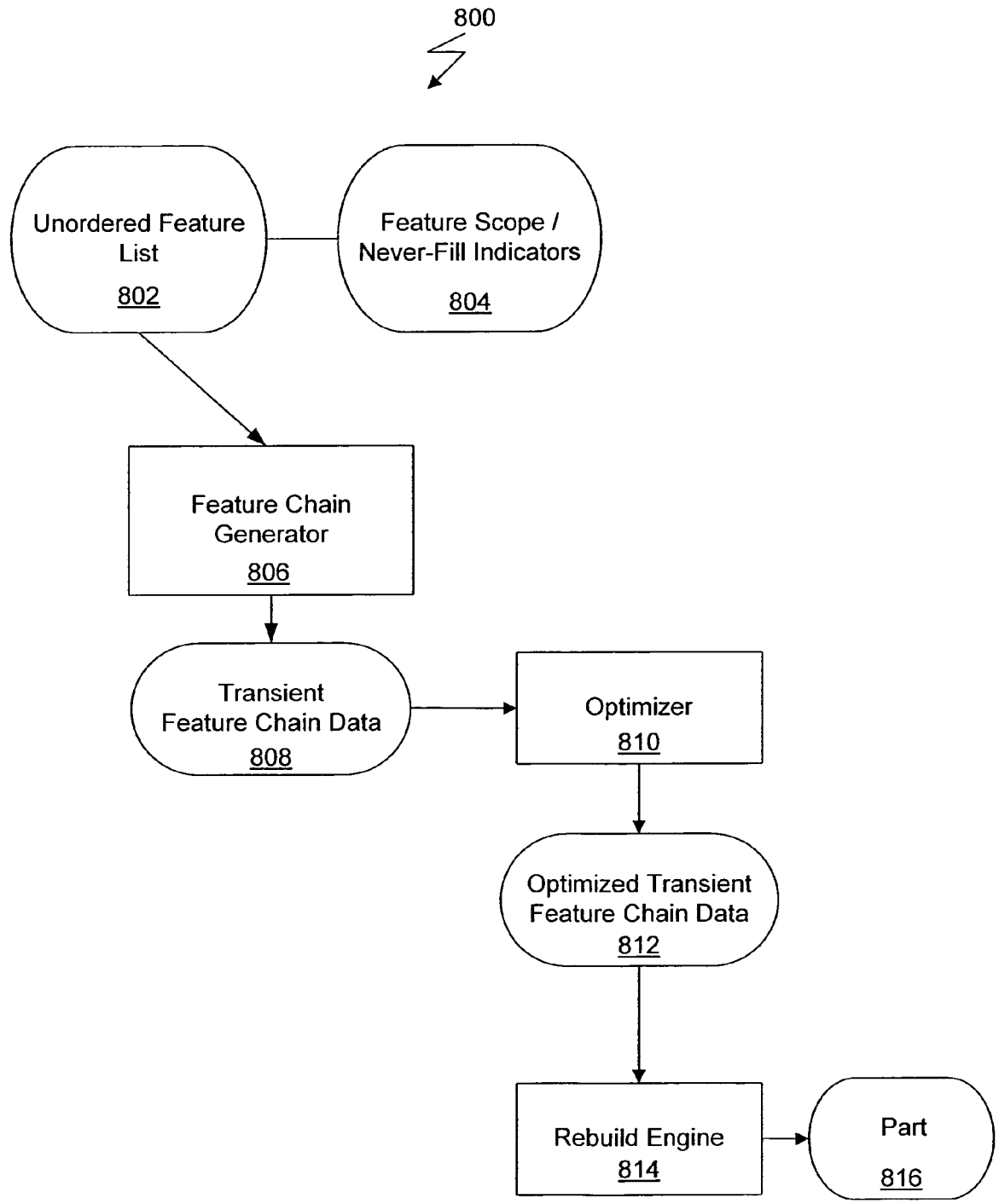
FIG. 8 is an illustration of data and procedures.

Referring now to FIG. 8, an illustration of data and procedures that may be used in an implementation of the present invention is shown. To generate a feature chain, data in the form of an unordered feature list 802, and for those features that remove material, data in the form of feature scope/never-fill indicators 804 is input to the feature chain generator 806. The feature chain generator 806 groups and orders features from the unordered feature list 802 in view of the feature scope/never-fill indicators 804, as previously discussed. The output from the feature chain generator is transient feature chain data 808.

Optionally, the transient feature chain data 808 may be used as input to an optimizer 810. (Otherwise, the transient feature chain data 808 is directly input to the rebuild engine 814.) The function of the optimizer 810 is to reduce the size of the feature chain and allow for more efficient processing of the feature chain data. Reducing the size of the feature chain allows for more efficient processing because the number of times a feature needs to be processed is decreased.

Optimized transient feature chain data 812 is output from the optimizer 810 and used as input to a rebuild engine 814. The rebuild engine 814 rebuilds the features individually based on the design engineer's input parameters and construction geometry that are stored with the data that defines the features. The present invention may use a rebuild engine such as that described in U.S. Pat. No. 5,815,154 to Hirschtick et al.

The output of the rebuild engine 814 is a part 816. The part may consist of geometry (e.g., vertices, edges, faces, and surfaces), and/or may consist of solid bodies in the case where solid features such as extrusions and fillets were used to define the part. Additionally, a feature may be a two-dimensional feature.

One advantage of the use of feature chains is that the feature chains may be rebuilt by separate threads or processors in a multi-processor computerized modeling system. Therefore, the performance of the present invention may increase in scale with the number of processors available in the computerized modeling system.

Referring back to FIG. 4, an example of a feature chain generated for the part shown in FIG. 4 will now be discussed. A simple feature chain is built beginning with a feature that adds material followed by all features that remove material from the feature that adds material. For example, the upper block 312 and lower block 314 shown in FIG. 4 add material, whereas the cut 402 removes material. Therefore, a first simple feature chain F1 beginning with upper block 312 and a second simple feature chain F2 beginning with lower block 314 is built, and both of these feature chains include cut 402. Additionally, a composite feature chain F3 would be constructed for the purpose of combining the first two feature chains. The feature chains that generate the part shown in FIG. 4 may be represented as follows:

F1=Upper Block 312|Cut 402

F2=Lower Block 314|Cut 402

F3=F1, F2

In the feature chain equations herein, the positive volumes of a feature chain are to the right of the equal sign and to the left of the "|" character, and the negative volumes of a feature chain are to the right of the "|" character. The "|" character denotes the combination of the positive and negative volumes in the feature chain. The third volume is denoted by the characters on the left side of the equation. Some equations use shorthand by leaving out the characters "|Ø" when the feature chain has no negative volume.

The chains may be optimized to reduce the size of the part definition and to increase the efficiency of computing resources. Consolidating all feature chains having identical features that remove material is one way feature chains may be optimized. Thus, in the preceding representation, feature chains F1, F2 and F3 may be combined as follows:

F4=Upper Block 312, Lower Block 314|Cut 402

Figure 9:
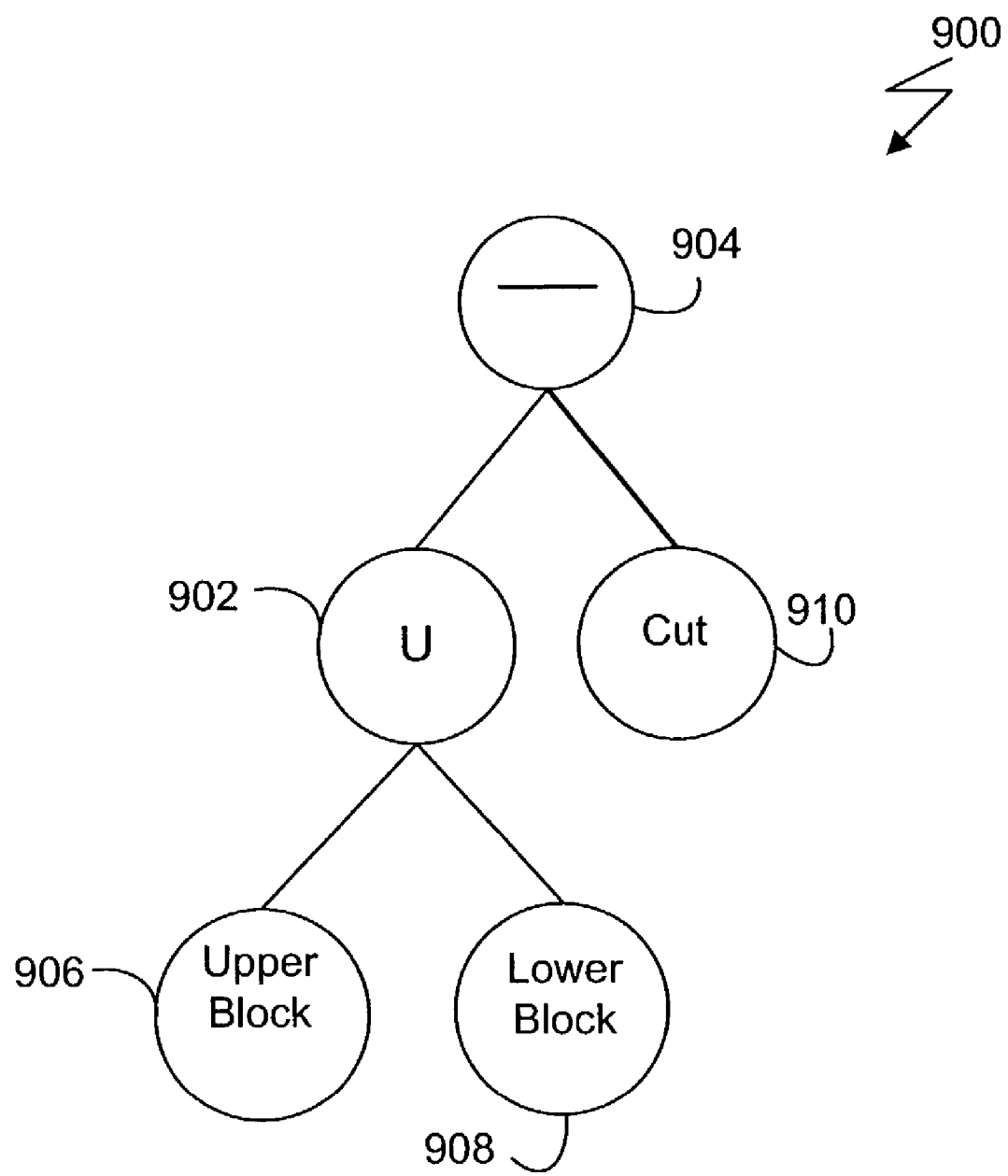
FIG. 9 is an illustration of a feature tree.

Referring now to FIG. 9, a tree-like visual representation (referred to as a feature tree 900), of the feature chain F4 is shown. The union operator 902 combines the upper block 312 and the lower block 314 (depicted by nodes 906 and 908, respectively). The subtraction operator 904 subtracts the cut 402 (depicted by node 910), from the union of the upper block 312 and the lower block 314. As shown in the tree 900, the operation 904 is a parent operation to child operations 902 and 910, and the operation 902 is a parent operation to child operations 906 and 908.

In one implementation, feature chains may also be considered features and used in other chains. A chain that only contains one feature (or one chain) is optimized by adding the feature to the final chain. For example, if a side block were added to the part in the foregoing example, an un-optimized feature chain F5 with one feature that is the side block and an optimized final feature chain F6 may be represented as follows:

F5=side block|Ø

F6=side block, F4

Referring once again to FIG. 5, the part illustrated in FIG. 5 contains a cut feature 502. Possibly, the design engineer defined lower block 314 first, followed by cut 502, and then upper block 312. If implicit scope is determined by feature existence, in this case, the cut 502 has implicit scope to act only upon lower block 314 because cut 502 was defined after lower block 314 and before upper block 312. The feature chains that represent the part illustrated in FIG. 5 may be represented as follows:

F1=Lower Block 314|Cut 502

F2=UpperBlock 312|Ø

F3=F1, F2

Figure 10:
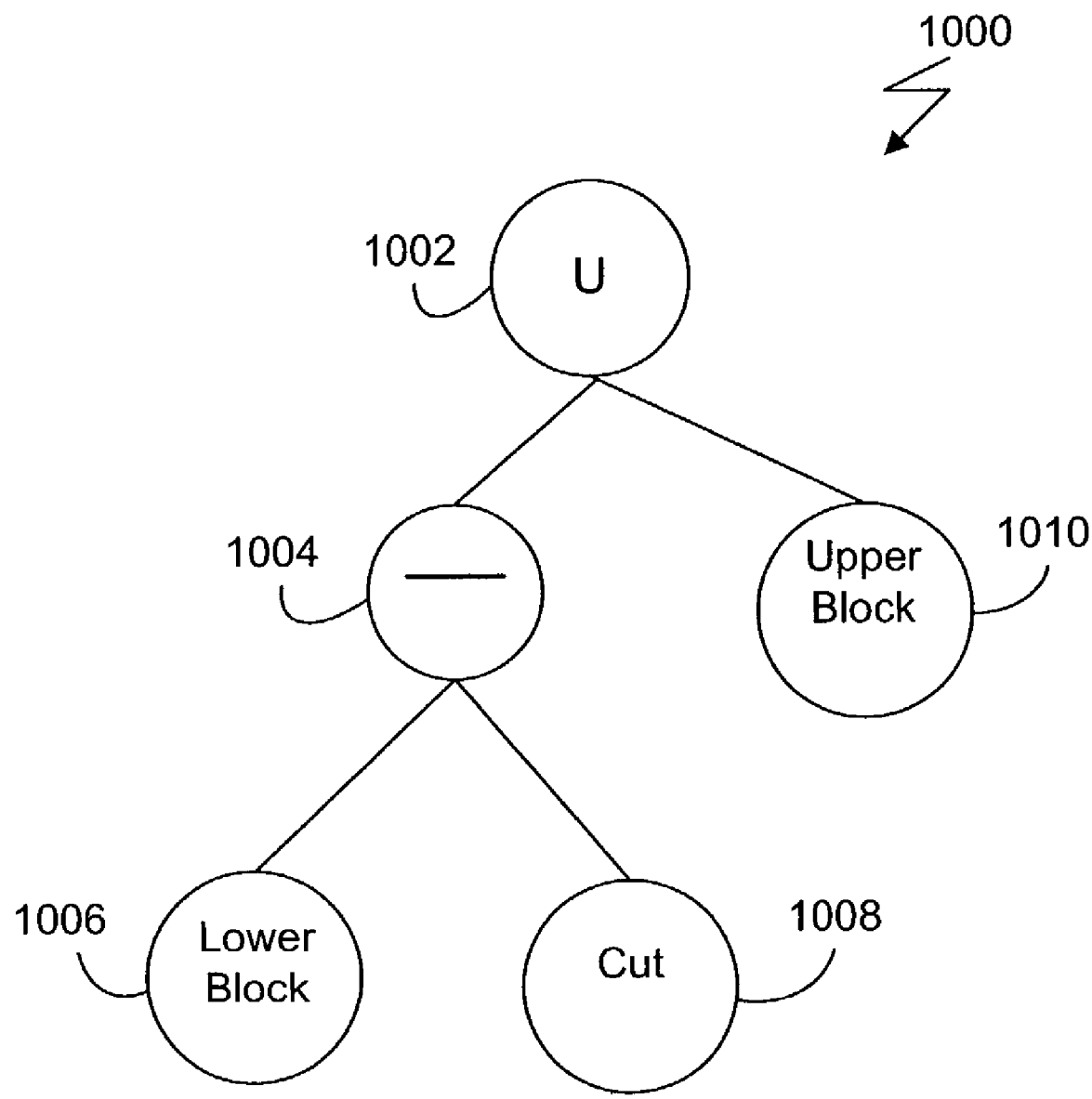
FIG. 10 is an illustration of a feature tree.

Referring now to FIG. 10, a feature tree 1000 that represents the feature chain for the part illustrated in FIG. 5 is shown. In FIG. 10, the subtraction operator 1004 has the effect of removing the material defined by the cut 502 (depicted as node 1008) from lower block 314 (depicted as node 1006). The union operator 1002 combines the result of the subtraction operation with the upper block 312 (depicted as node 1010).

The part illustrated in FIG. 5 would appear as the part illustrated in FIG. 4 if the feature scope is not ultimately determined by the pre-existence of features. For example, a different implicit scope may be associated with cut 502 if a "never-fill" attribute was specified for the cut 502 when the cut 502 was created, resulting in an implicit scope such that every feature that adds material is affected by the cut 502 in such a way that the cut 502 could never be filled by any feature that adds material. (A "never-fill" attribute may be specified for the cut 502 after the creation of the cut 502 and after the subsequent creation of other features, in which case, the "never-fill" attribute may result in an explicit scope specification.) Cuts having a "never-fill" attribute are added to the negative volume in the final feature chain. The part illustrated in FIG. 5 would also appear as the part illustrated in FIG. 4 if an explicit scope is specified after all the features were defined by, for example, using a feature scope command provided in the user interface, as was previously discussed. Feature chains are automatically re-created to re-group and re-order features as necessary when explicit feature scope is specified.

Figure 11:
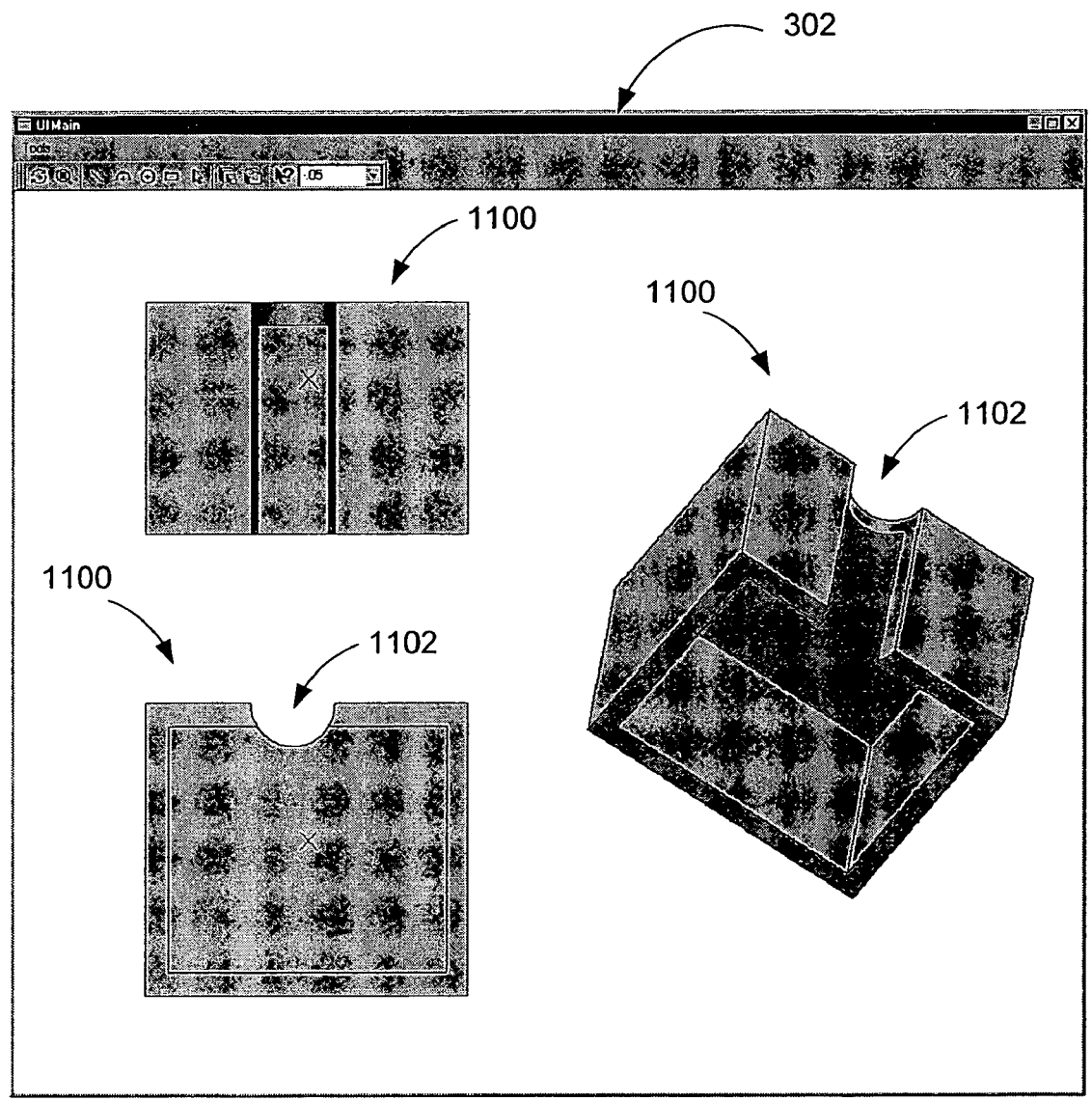
FIG. 11 is an illustration of three views of a part.

Referring now to FIG. 11, the window 302 containing three views of a part 1100 is shown. The part was created by shelling a block feature (meaning that the block feature was hollowed), then applying a cylindrical cut 1102 to the hollowed block feature. When a feature is shelled, the design engineer may specify a face to be removed, in addition to specifying the thickness of the wall of the shell. In FIG. 11, a rectangular face is removed to reveal the inside of the part 1100.

There are two different kinds of shell operations, which are an inward shell operation and an outward shell operation. An inward shell operation offsets the original faces of a solid in an inward direction and constructs new shell faces on the inside of the part. An outward shell operation offsets the original faces in an outward direction, leaving the inverted original faces on the inside of the part and constructing new shell faces on the outside of the part. An outward shell operation grows the part in overall size, whereas the part remains the same overall size after the inward shell operation completes. The inward shell operation is a two-part operation. First, the faces of the features that define the shell are offset inward in a standard offset operation. The result of the offset operation is a solid that is then subtracted from the original solid leaving the final shelled result. A procedure to create an outward shell is also comprised of two distinct operations. The first operation offsets the original body outward. The second operation subtracts the original body from the offset body. Parts may have multiple shelling features that affect various subsets of features within a part.

To generate the feature chains for the part shown in FIG. 11, a first chain F1 consisting of only a block is created. Next, the block feature that defines the shell forms feature chain F2. (If one or more features in addition to the block were to define the shell, all those features would be grouped together to form the feature chain F2.) An inward offset operation is applied to the result of F2 to form O1 (i.e., the offset body). Next, the offset O1 is subtracted from F1 resulting in F3. Finally, the cylindrical cut is subtracted from F3 to form the feature chain F4.

F1=block|Ø

F2=block|Ø

O1=offset F2

F3=F1|O1

F4=F3|cylindrical cut

Figure 12:
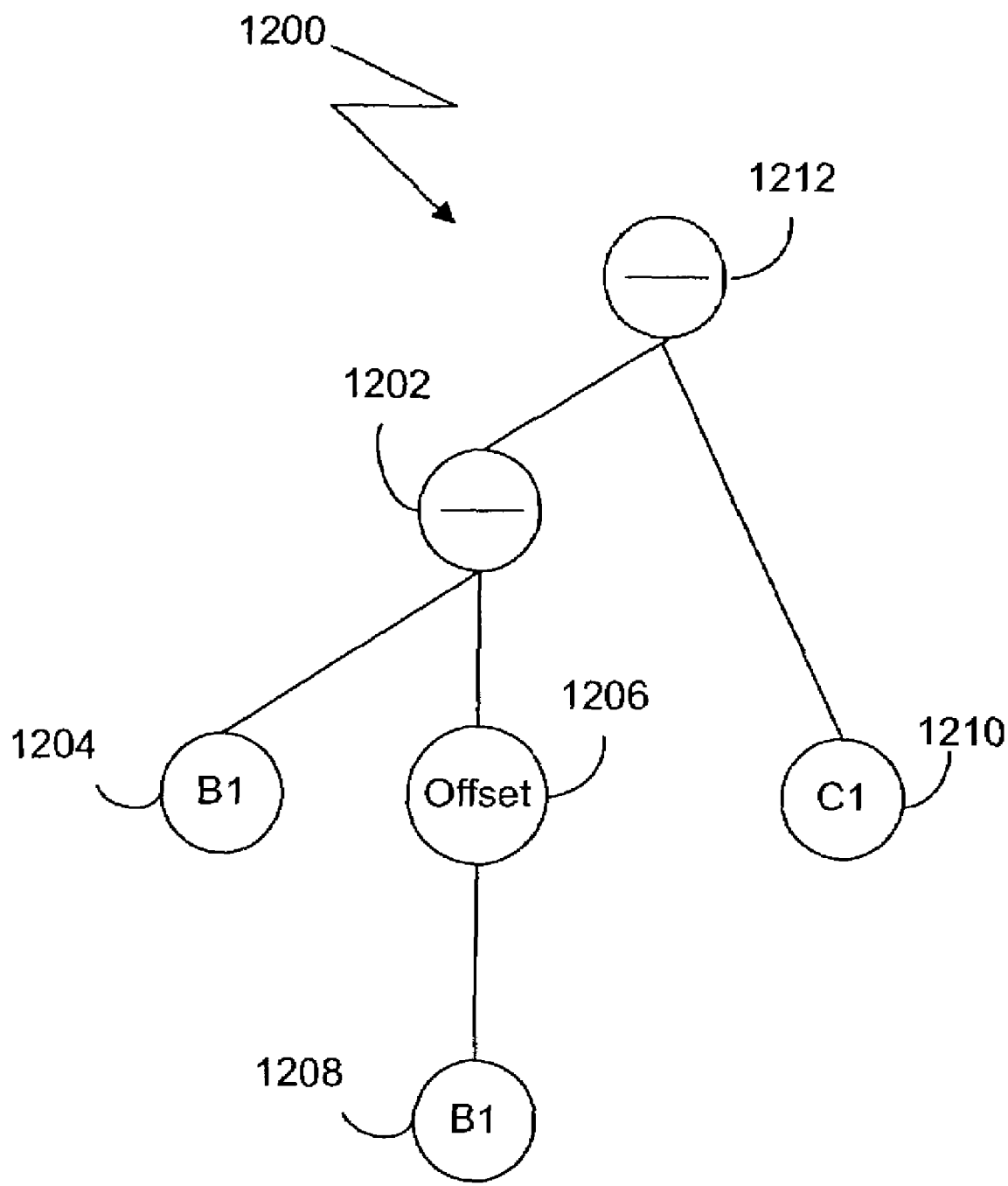
FIG. 12 is an illustration of a feature tree.

FIG. 12 is a feature tree representation 1200 of the preceding feature chains. Node 1204 and node 1208 represent the block, which is identical, in F1 and F2. Node 1206 represents the offset operation, and together with node 1208 depicts the feature chain O1. Node 1202 represents a subtraction operation and forms the feature chain F3 by subtracting the offset block from the block (which will cause the creation of the shelled block). Node 1212 represents a subtraction operation and forms the feature chain F4 by subtracting the cylindrical cut represented by node 1210 from the shelled block.

Figure 13:
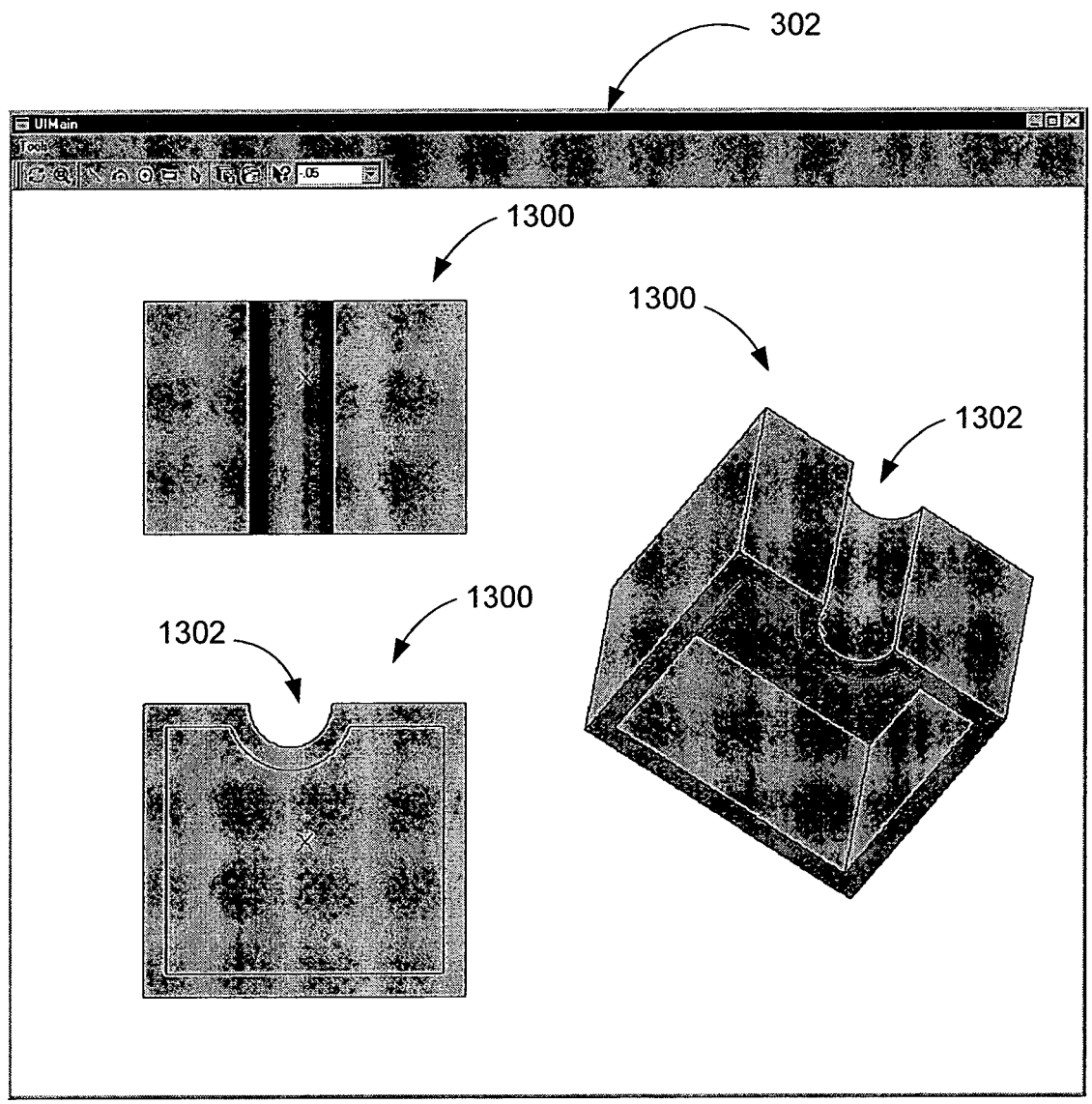
FIG. 13 is an illustration of three views of a part.

Referring now to FIG. 13, the window 302 containing three views of a part 1300 is shown. FIG. 13 differs from FIG. 11 because a cylindrical cut 1302 is included in the definition of the shell (i.e., the cylindrical cut 1302 is included in the offset operation). The result being that the cylindrical cut 1302 is shelled instead of the shell being cut by a cylinder as shown in FIG. 11. The feature chains that represent the part 1300 shown in FIG. 13 may be represented as follows:

F1=block|cylinder cut

F2=block|cylinder cut

O1=offset F2

F3=F1|O1

Figure 14:
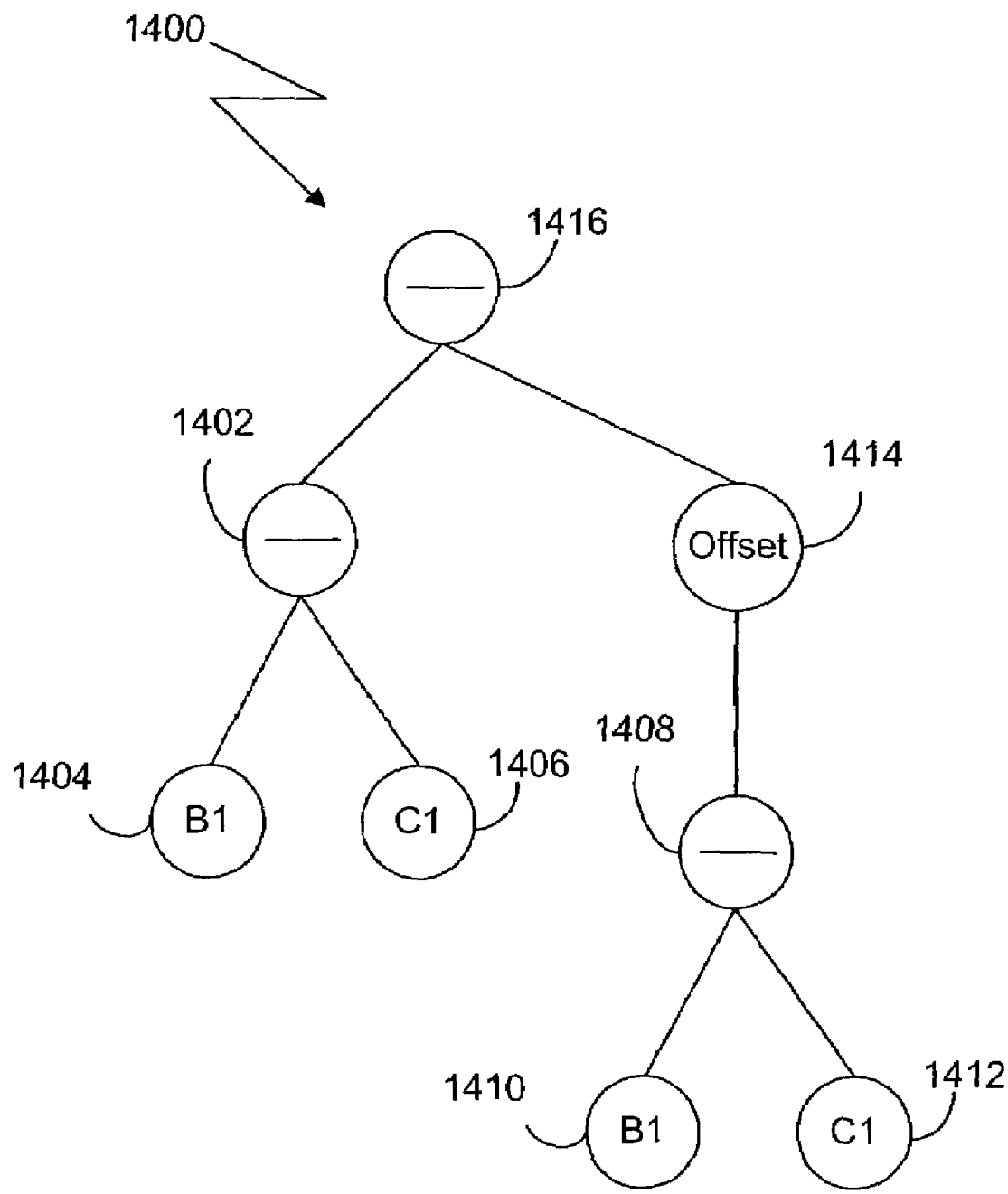
FIG. 14 is an illustration of a feature tree.

FIG. 14 is a feature tree representation 1400 of the feature chains that produce the shelled part 1300 in FIG. 13. The feature chain defining the original body F1 is depicted by nodes 1402, 1404, and 1406, which represent a subtraction operation, a block, and a cut, respectively. An identical feature chain F2 is depicted by nodes 1408, 1410, and 1412. The feature chain defining the offset body O1 is represented by node 1414 (i.e., the offset operation) and the nodes subordinate to node 1414. Finally, node 1416 forms feature chain F3 by subtracting the offset body from the original body. Note that in the current configuration, F1 and F2 are identical and thus can be optimized to avoid redundant processing.

As discussed, shells are constructed by two distinct operations, namely, an offset operation and a subtraction operation. The set of features used as input to these operations can differ. The set of features used as input to the offset operation is referred to as the "shell definition." The set of features used as input to the subtraction operation is referred to as the "shell scope." In the example described with reference to FIG. 11 and FIG. 12, and the example described with reference to FIG. 13 and FIG. 14, the shell definition and shell scope are identical. However, this need not be the case.

Consider the example where two bosses B1 and B2 are united. A number of different shells can be created using bosses B1 and B2, depending on the shell definition and shell scope. For example, the shell definition and shell scope can be comprised of both B1 and B2. Alternatively, the shell definition can be limited to B1 only while the shell scope remains both B1 and B2. Other possible results arise using various combinations of B1 and/or B2 for the shell definition and shell scope including, by way of non-limiting example, when both the definition and scope are limited to B1.

This flexibility in the way in which feature scope can be defined allows for designs to be created that are otherwise quite complex to create in a conventional history-based modeler. For example, local shelling (i.e., some portions of a part are shelled and not others) is quite straight forward using the present invention because the shell definition can simply be limited to the features that are to be hollowed. However, in a conventional history-based modeling approach, local shelling is very difficult because the design engineer needs to plan the feature order and the precise feature groupings necessary to create a local shell in advance.

One skilled in the art should appreciate that model management technology described herein saves a design engineer a considerable amount of time and effort while designing an assembly consisting of parts. The present invention provides substantial automation where a great deal of manual intervention was previously necessary. A design engineer who is not in the habit of contemplating feature order (e.g., an engineer trained to design in 2D), does not have to strategize about order when beginning to work with a three-dimensional CAD system. Likewise, a design engineer accustomed to working in 3D no longer needs to contemplate how features should be ordered prior to beginning to construct a part using a 3D CAD system. The order in which features are created is no longer an issue with the present invention.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. For example, implementations that base implicit scope on feature existence and feature proximity may be mutually exclusive. Additionally, the feature chain generator may also build simple feature chains whenever a feature is moved to apply proximity criteria for determining feature scope at subsequent re-generations of the part. Alternatively, a single implementation may give the user a choice whether to base implicit scope on feature order or feature proximity, and allow the user to change that choice while designing a part.

Implementations may change the order in which operations are performed. Depending on the needs of an implementation, particular operations described herein may be implemented as a combined operation, eliminated, added to, or otherwise rearranged. Accordingly, other embodiments are within the scope of the following claims.

What is claimed is:

1. A computer-implemented method of modeling a three-dimensional object, comprising:
   storing data in a computer-readable data storage medium representing a computer model of the three-dimensional object, the data comprising a plurality of feature objects, wherein each feature object defines a feature of the computer model;
   forming a first grouping of features comprising at least one of the plurality of feature objects, wherein the first grouping of features has a design effect limited in scope such that an operation for removing material operates to affect a plurality of features of the computer model defined by ones of the plurality of feature objects in the first grouping of features and does not affect the plurality of features of the computer model defined by ones of the plurality of feature objects not in the first grouping of features;

forming a second grouping of features comprising at least one of the plurality of feature objects, wherein the second grouping of features has a limited scope such that only the plurality of features of the computer model defined by ones of the plurality of feature objects in the second grouping of features are affected by a process that removes material; and combining the first grouping of features and the second grouping of features to form a combination of groupings of features that represents a hierarchical interrelationship among the plurality of feature objects; wherein:

the hierarchical interrelationship defines on which ones of the plurality of feature objects one or more operations are performed;

constructing the computer model using the hierarchical interrelationship independent of the user's order of creation of each one of the plurality of feature objects; and displaying the constructed computer model for a user to evaluate or manipulate the model.

2. The computer-implemented method of claim 1, wherein forming the first grouping of features chain comprises:

reading an unordered feature list comprising the plurality of feature objects;

identifying at least one feature object that adds material to the computer model; and identifying at least one feature object that removes material from the computer model and is associated by a scope definition with at least one feature object that adds material.

3. The computer-implemented method of claim 2, wherein at least one feature object that removes material has a never-fill attribute indicating a cutting effect on each feature object that adds material.

4. The computer-implemented method of claim 1, further comprising optimizing the combination of groupings of features.

5. The computer-implemented method of claim 1, wherein the combination of groupings of features defines a regeneration order independent of the order of creation of the plurality of feature objects for generating a part.

6. The computer-implemented method of claim 2, wherein the scope definition is based on feature object existence.

7. The computer-implemented method of claim 2, wherein the scope definition is based on feature object proximity.

8. The computer-implemented method of claim 2, wherein the scope definition is based on a combination of feature object existence and feature object proximity.

9. The computer-implemented method of claim 2, wherein an instruction issued by a user modifies the scope definition, and wherein the instruction explicitly specifies one of the feature objects to include in the scope definition and one of the feature objects to exclude from the scope definition.

10. The computer-implemented method of claim 9, wherein a user interface dialog facilitates the explicit specification of the scope definition.

11. A computer-readable data storage device comprising instructions for causing a computer to:

store a data structure defining a model of a real-world three-dimensional object as a hierarchical arrangement of a plurality of model feature objects, wherein:

the hierarchical arrangement specifies one or more operations to perform on ones of the plurality of the model feature objects by a modeling program to generate the model for display on a computer display; and the hierarchical arrangement is independent of an order of creation of the plurality of model feature objects;

receive data from a user to define an additional model feature object;

receive data from the user to define a feature scope associated with the additional model feature object, said feature scope specifying at least one other model feature object affected by the additional model feature object; and modify the hierarchical arrangement of the plurality of model feature objects based on the feature scope of the additional model feature object; and regenerate the model independent of the user's feature creation order on the computer display for the user to evaluate or manipulate.

12. The data storage device of claim 11, wherein the hierarchical arrangement is a tree structure and the method further comprises generating the model by parsing the tree structure and determining a scope of operation of each model feature object with respect to other model feature objects based on relative positions of model feature objects in the hierarchical arrangement.

13. The data storage device of claim 11, wherein:

the feature scope associated with the additional model feature object is an explicit feature scope; and the data storage device further comprises instructions to receive user input explicitly identifying other model feature objects affected by the additional model feature object.

14. The data storage device of claim 13, wherein receiving user input comprises receiving user-selection of a plurality of model features displayed on a graphical interface device, and processing the user input to identify the other model feature objects affected by the additional model feature object.

15. The data storage device of claim 11, wherein:

each of the plurality of model feature objects that removes material has an implicit feature scope; and the data storage device further comprises instructions to:

determine which of the plurality of model feature objects that removes material affects other ones of the plurality of model feature objects that add material based on the implicit feature scope.

16. The data storage device of claim 15, wherein:

one of the plurality of model feature objects comprises a cut feature; and the implicit feature scope of the cut feature sets a never-fill attribute associated with the cut feature.

17. The data storage device of claim 16, wherein the never-fill attribute prevents any other model feature object from adding material to the model in a region cut by said cut feature.

18. The data storage device of claim 16, wherein the never-fill attribute may be overridden by the user such that a specified other model feature object may affect addition of material to a region cut by the cut feature.

19. The data storage device of claim 15, wherein:
the implicit feature scope of one of the plurality of model feature objects that removes material is determined by a physical proximity of that one of the plurality of model feature objects that removes material to one or more model feature objects that add material.

20. The data storage device of claim 15, wherein:
the implicit feature scope of one of the plurality of model feature objects that removes material is determined by an existence of other ones of the plurality of model feature objects.

21. A digital computer comprising:
a memory, data stored in said memory, and control information stored in said memory; and
a data processor for processing said data in accordance with said control information;
wherein,
said control information is arranged to:
   process a data structure defining a hierarchical arrangement of a plurality of model feature objects to generate on a computer display a model of a real-world three-dimensional object; wherein:
      the hierarchical arrangement comprises a first model feature object that removes materials from other ones of the plurality of model feature objects subsequently positioned to the first model feature object in the hierarchical arrangement; and
      the hierarchical arrangement is independent of an order of creation of the plurality of model feature objects;
   receive data from a user to define an additional model feature object;
   receive data from the user to define a feature scope associated with the additional model feature object, said feature scope determining at least one other model feature object affected by said additional model feature object; and
modifying the hierarchical arrangement of the plurality of model feature objects based on the feature scope thereby changing the model of the real-world three-dimensional object and the model's appearance on the computer display.

\* \* \* \* \*